US012457909B2

(12) United States Patent
Yamada

(10) Patent No.: US 12,457,909 B2
(45) Date of Patent: Oct. 28, 2025

(54) MAGNETIC DOMAIN WALL MOVING ELEMENT, MAGNETIC ARRAY, AND NEUROMORPHIC DEVICE

(71) Applicant: TDK CORPORATION, Tokyo (JP)

(72) Inventor: Shogo Yamada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 542 days.

(21) Appl. No.: 17/994,751

(22) Filed: Nov. 28, 2022

(65) Prior Publication Data

US 2024/0180044 A1    May 30, 2024

(51) Int. Cl.
*H10N 50/80* (2023.01)
*G06N 3/065* (2023.01)
*H10B 61/00* (2023.01)
*H10N 50/20* (2023.01)

(52) U.S. Cl.
CPC .............. *H10N 50/80* (2023.02); *H10B 61/22* (2023.02); *H10N 50/20* (2023.02); *G06N 3/065* (2023.01)

(58) Field of Classification Search
CPC ........ H10N 50/80; H10N 50/20; H10N 50/10; H10B 61/22; G06N 3/065; G01R 33/1292
See application file for complete search history.

(56) References Cited

U.S. PATENT DOCUMENTS

| | | | |
|---|---|---|---|
| 2011/0129691 A1 | 6/2011 | Shiwata et al. | |
| 2018/0301199 A1 | 10/2018 | Sasaki | |
| 2020/0105310 A1 | 4/2020 | Ashida et al. | |
| 2021/0098690 A1* | 4/2021 | Ashida | H10N 50/10 |
| 2023/0063084 A1* | 3/2023 | Pham | H10N 52/80 |

FOREIGN PATENT DOCUMENTS

| | | |
|---|---|---|
| JP | 5441005 B2 | 3/2014 |
| JP | 2018-182291 A | 11/2018 |
| JP | 2020-53660 A | 4/2020 |

OTHER PUBLICATIONS

Burr et al., "Neuromorphic computing using non-vioalitle memory", Advances in Physics: X,2:1, 89, 2017.
Shibata et al., "Linear and symmetric conductance response of magnetic domain wall type spinmemristor for analog neuromorphic computing", Applied Physics Express 13, 043004, 2020.

* cited by examiner

*Primary Examiner* — Shih Tsun A Chou
(74) *Attorney, Agent, or Firm* — Oliff PLC

(57) ABSTRACT

A magnetic domain wall moving layer, reference layer, non-magnetic layer, a first, second, and third electrode. Magnetic domain wall moving layer includes first area wherein an orientation direction of magnetization is fixed, second area wherein orientation direction of magnetization is fixed in direction different from that of first area, and third area sandwiched between first and second areas wherein orientation direction of magnetization is changeable. First electrode is connected to first area. Second electrode is connected to second area. In magnetic domain wall moving element, a read current flows between second and third electrodes. In first direction, a center of third area in first direction is between center of first connection surface of third electrode and reference layer in first direction and center of second connection surface of second electrode and magnetic domain wall moving layer in first direction.

14 Claims, 12 Drawing Sheets

MAGNETIC DOMAIN WALL MOVING ELEMENT, MAGNETIC ARRAY, AND NEUROMORPHIC DEVICE

BACKGROUND

Field of the Invention

The present invention relates to a magnetic domain wall moving element, a magnetic array, and a neuromorphic device.

Description of Related Art

A magneto-resistive effect element is known that utilizes a resistance change (magneto-resistive change) in response to changes in the relative angle of magnetization of two ferromagnetic layers. For example, a magnetic domain wall moving type magneto-resistive effect element (hereinafter referred to as a magnetic domain wall moving element) described in Patent Document 1 is an example of the magneto-resistive effect element. The magnetic domain wall moving element can change the resistance in the lamination direction depending on the position of a magnetic domain wall, and record data in multiple values or analog.

The magnetic domain wall moving element can be used, for example, in a neuromorphic device that mimics the functions of a brain as described in Patent Document 2.

PATENT DOCUMENTS

[Patent Document 1] Japanese Patent No. 5441005
[Patent Document 2] Japanese Unexamined Patent Application, First Publication No. 2020-053660

SUMMARY

In order to make a multi-valued magnetic domain wall moving element, studies are underway to lengthen a magnetic domain wall moving layer and a reference layer of the magnetic domain wall moving element in a longitudinal direction. In addition, to reduce a write current value of the magnetic domain wall moving element, studies are underway to narrow a width and to reduce a thickness of the magnetic domain wall moving layer and the reference layer of the magnetic domain wall moving element. The inventors found that as the magnetic domain wall moving layer and the reference layer become longer, narrower, and thinner, their resistance in the longitudinal direction increases, and this resistance in the longitudinal direction becomes a problem. Part of a read current of the magnetic domain wall moving element flows along the magnetic domain wall moving layer and the reference layer. If the resistance of the magnetic domain wall moving layer and the reference layer in the longitudinal direction is large, a large voltage drop occurs between electrodes when the read current flows through the magnetic domain wall moving layer and the reference layer in the longitudinal direction. According to the position of an electrode in the magnetic domain wall moving element, an amount of voltage drop varies depending on a path of the read current, and a magnitude of the read voltage effectively applied to a non-magnetic layer varies depending on the position in the longitudinal direction. As a result, an amount of change in the read current according to a movement of a magnetic domain wall is no longer constant, and the linearity of an output (a read current value) with respect to an input deteriorates.

The present disclosure has been made in view of the problems described above, and an object thereof is to provide a magnetic domain wall moving element with high linearity of a read current, and a magnetic array and a neuromorphic device using this magnetic domain wall moving element.

A magnetic domain wall moving element according to a first aspect includes a magnetic domain wall moving layer, a reference layer, a non-magnetic layer, a first electrode, a second electrode, and a third electrode. The non-magnetic layer is sandwiched between the magnetic domain wall moving layer and the reference layer. The first electrode is connected to the magnetic domain wall moving layer. The second electrode is connected to the magnetic domain wall moving layer at a position different from the first electrode. The third electrode is connected to the reference layer. The magnetic domain wall moving layer includes a first area in which an orientation direction of magnetization is fixed, a second area in which the orientation direction of magnetization is fixed in a direction different from that of the first area, and a third area sandwiched between the first area and the second area and in which the orientation direction of magnetization is changeable. The first electrode is connected to the first area. The second electrode is connected to the second area. The magnetic domain wall moving layer has a length in a first direction longer than a length in a second direction orthogonal to the first direction when viewed in a lamination direction. In this magnetic domain wall moving element, a read current flows between the second electrode and the third electrode. In the first direction, a center of the third area in the first direction is between a center of a first connection surface of the third electrode and the reference layer in the first direction and a center of a second connection surface of the second electrode and the magnetic domain wall moving layer in the first direction.

DETAILED DESCRIPTION

Figure 1:
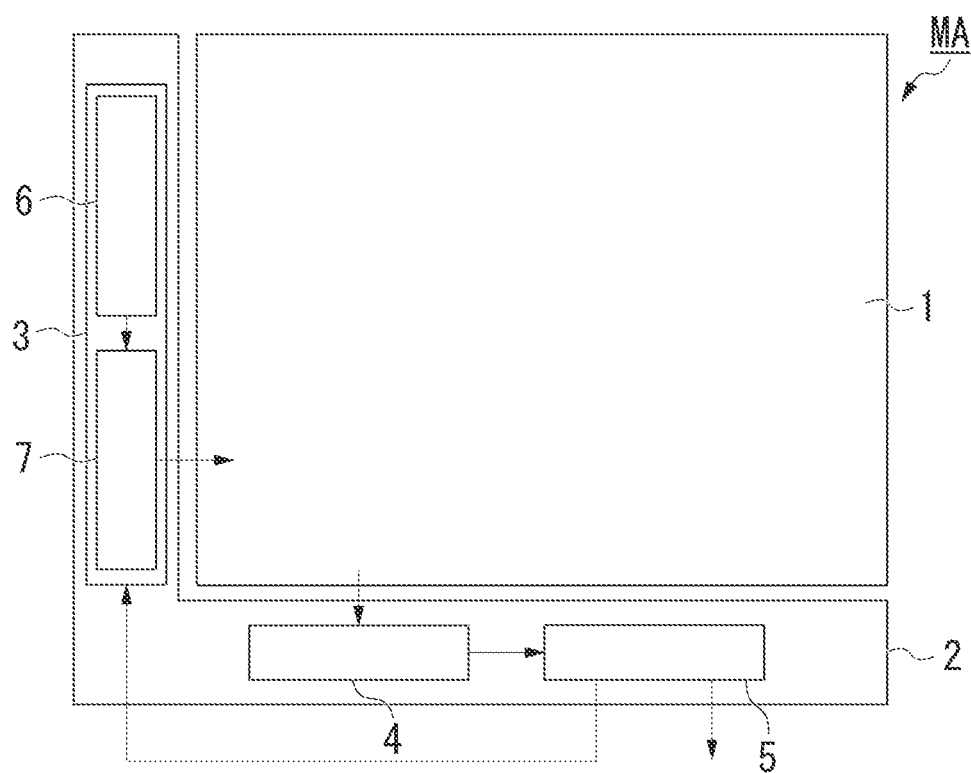
FIG. 1 is a block diagram of a magnetic array according to a first embodiment.

Hereinafter, the present embodiment will be described in detail with appropriate reference to the drawings. In the drawings used in the following description, there are cases where characteristic portions are enlarged for convenience to make it easier to understand features of the present invention, and dimensional ratios of each component may differ from the actual ones. Materials, dimensions, and the like exemplified in the following description are examples, and the present invention is not limited thereto and can be implemented with appropriate modifications within a scope of the present invention.

First, directions are defined. An x direction and a y direction are directions substantially parallel to one surface of a substrate Sub (refer to FIG. 3), which will be described below. The x direction is a direction in which a magnetic domain wall moving layer, which will be described below, extends. The y direction is a direction orthogonal to the x direction. A z direction is a direction from the substrate, which will be described below, toward a magnetic domain wall moving element. In this specification, a +z direction may be expressed as "up" and a −z direction may be expressed as "down," but these expressions are for convenience and do not define a direction of gravity. In this specification, "extending in the x-direction" means, for example, that a dimension in the x-direction is larger than a minimum dimension among dimensions in the x direction, the y direction, and the z direction. The same will be applied in cases of extending in other directions. In addition, a term "connected" as used herein is not limited to a case of being directly connected, but also includes a case of being connected via another object in between.

First Embodiment

FIG. 1 is a block diagram of a magnetic array MA according to a first embodiment. The magnetic array MA has an accumulation area 1 and a peripheral area 2. The magnetic array MA can be used for, for example, a magnetic memory, a sum-of-products calculator, a neuromorphic device, a spin memristor, and a magneto-optical device.

The accumulation area 1 is an area in which a plurality of magnetic domain wall moving elements are accumulated. When the magnetic array MA is used as a memory, data is accumulated in the accumulation area 1. When the magnetic array MA is used as a neuromorphic device, learning and inference are performed in the accumulation area 1.

The peripheral area 2 is an area in which control elements for controlling an operation of the magnetic domain wall moving element in the accumulation area 1 are mounted. The peripheral area 2 has, for example, a pulse application device 3, a resistance detection device 4, and an output unit 5.

The pulse application device 3 is configured to be able to apply a pulse to at least one of the plurality of magnetic domain wall moving elements within the accumulation area 1. The pulse application device 3 has, for example, a control unit 6 and a power supply 7.

The control unit 6 has, for example, a processor and memory. The processor is, for example, a central processing unit (CPU). The processor operates on the basis of an operation program stored in the memory. Details of the operation program will be described below. The control unit 6 controls, for example, an address of a magnetic domain wall moving element to which a pulse is applied, a magnitude (voltage, pulse length) of a pulse applied to a predetermined magnetic domain wall moving element, and the like. The control unit 6 may also have a clock, a counter, a random number generator, and the like. The clock serves as an indicator of a timing of applying the pulse, and the counter counts the number of times a pulse is applied. The power supply 7 applies a pulse to a magnetic domain wall moving element according to an instruction from the control unit 6.

The resistance detection device 4 is configured to be able to detect resistances of the magnetic domain wall moving elements within the accumulation area 1. The resistance detection device 4 may detect the resistance of each of the magnetic domain wall moving elements within the accumulation area 1, or may detect, for example, a sum of the resistances of the magnetic domain wall moving elements belonging to the same row. The resistance detection device 4 has, for example, a comparator that compares between magnitudes of the detected resistances. The comparator may, for example, compare the detected resistances with each other, or compare the detected resistance with a reference resistance set in advance.

The output unit 5 is connected to the resistance detection device 4. The output unit 5 has, for example, a processor, an output capacitor, an amplifier, a converter, and the like. When the magnetic array MA is used as a neuromorphic device, the output unit 5 may perform a calculation to substitute a result of the detection by the resistance detection device 4 into an activation function. The calculation is performed by, for example, a processor. The output unit 5 outputs a result of the calculation to the outside. When the magnetic array MA is used as a neuromorphic device, for example, an operation such as outputting the calculation result as an input signal to another magnetic array may be performed, or an operation such as outputting the calculation result to the outside as an identification rate may also be performed. In addition, the output unit 5 may feed-back the calculation result to the pulse application device 3.

Figure 2:
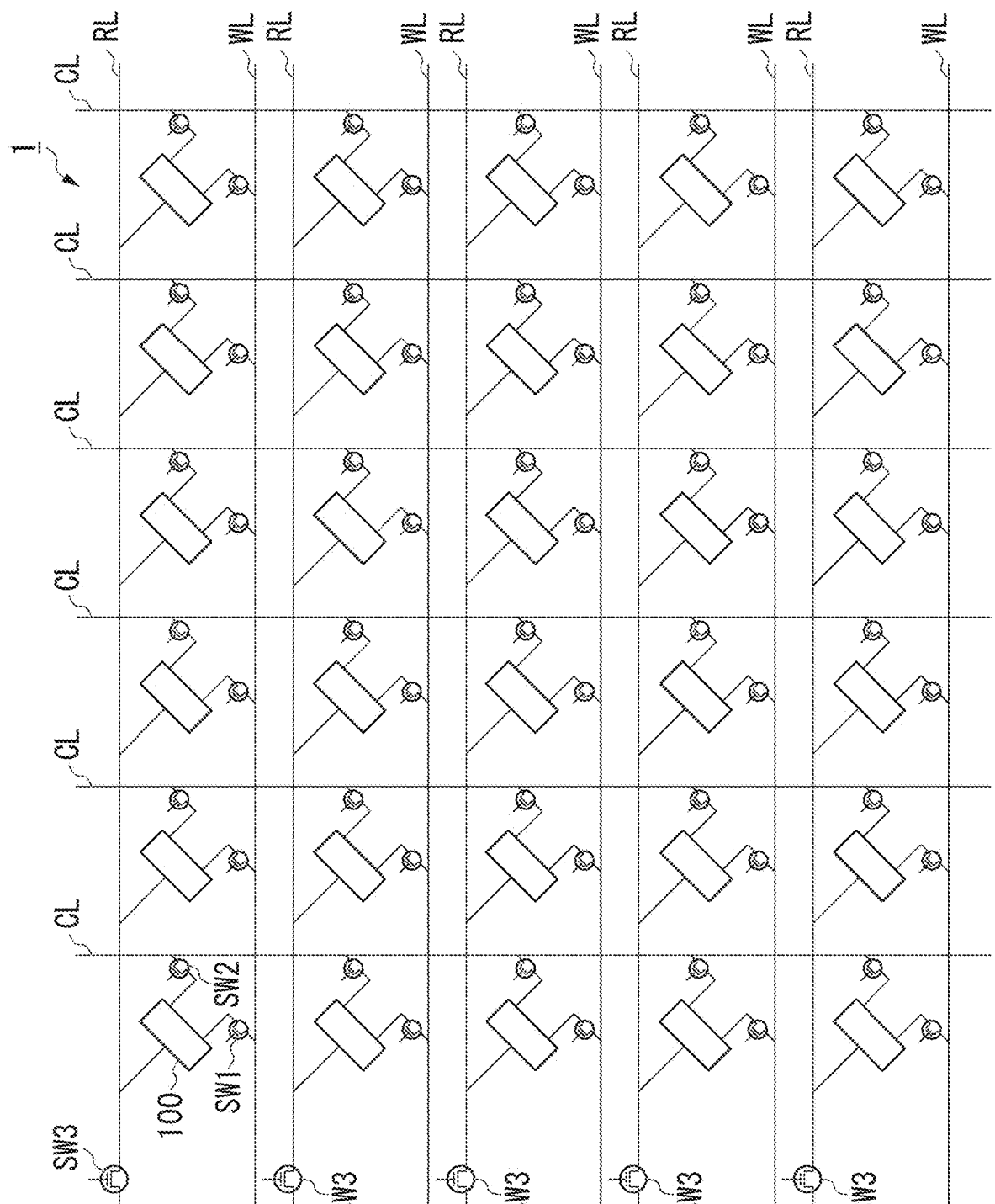
FIG. 2 is a circuit diagram of an accumulation area of the magnetic array according to the first embodiment.

FIG. 2 is a circuit diagram of the accumulation area 1 according to the first embodiment. The accumulation area 1 includes a plurality of magnetic domain wall moving elements 100, a plurality of first wirings WL, a plurality of second wirings CL, a plurality of third wirings RL, a plurality of first switching elements SW1, and a plurality of second switching elements SW2. The third switching element SW3 may belong to, for example, the pulse application device 3 in the peripheral area 2.

The plurality of magnetic domain wall moving elements 100 are arranged, for example, in a form of matrix. The plurality of magnetic domain wall moving elements 100 are not limited to an arrangement of real elements in the form of matrix, but may be an arrangement in a matrix in a circuit diagram.

Each of the first wirings WL is a write wiring. Each of the first wirings WL electrically connects the pulse application device 3 and one or more of the magnetic domain wall moving elements 100. Each of the second wirings CL is a common wiring that can be used both at the time of writing data and at the time of reading data. Each of the second wirings CL is connected to, for example, the resistance detection device 4. The second wirings CL may be provided for each of the plurality of magnetic domain wall moving elements 100 or may be provided across the plurality of magnetic domain wall moving elements 100. Each of the third wirings RL is a read wiring. Each of the third wirings RL electrically connects the pulse application device 3 and one or more of the magnetic domain wall moving elements 100.

The first switching element SW1, the second switching element SW2, and the third switching element SW3 are elements for controlling a current flow. The first switching element SW1, the second switching element SW2, and the third switching element SW3 are, for example, a transistor, an element using a phase change of a crystal layer such as an ovonic threshold switch (OTS), an element using a band structure change such as a metal-insulator transition (MIT) switch, an element using a breakdown voltage such as a Zener diode and an avalanche diode, and an element whose conductivity changes with a change in atomic position.

The first switching element SW1 and the second switching element SW2 are connected to, for example, each magnetic domain wall moving element 100 one by one. The first switching element SW1 is connected, for example, between the magnetic domain wall moving element 100 and the first wiring WL. The second switching element SW2 is connected, for example, between the magnetic domain wall moving element 100 and the second wiring CL. The third switching element SW3 is connected, for example, across the plurality of magnetic domain wall moving elements 100. The third switching element SW3 is connected to, for example, the third wiring RL.

A positional relationship among the first switching element SW1, the second switching element SW2, and the third switching element SW3 is not limited to the case shown in FIG. 2. For example, the first switching element SW1 may be connected across the plurality of magnetic domain wall moving elements 100 and positioned upstream of the first wiring WL. In addition, for example, the second switching element SW2 may be connected across the plurality of magnetic domain wall moving elements 100 and positioned upstream of the second wiring CL. Moreover, for example, the third switching element SW3 may be connected to each of the magnetic domain wall moving elements 100 one by one.

Figure 3:
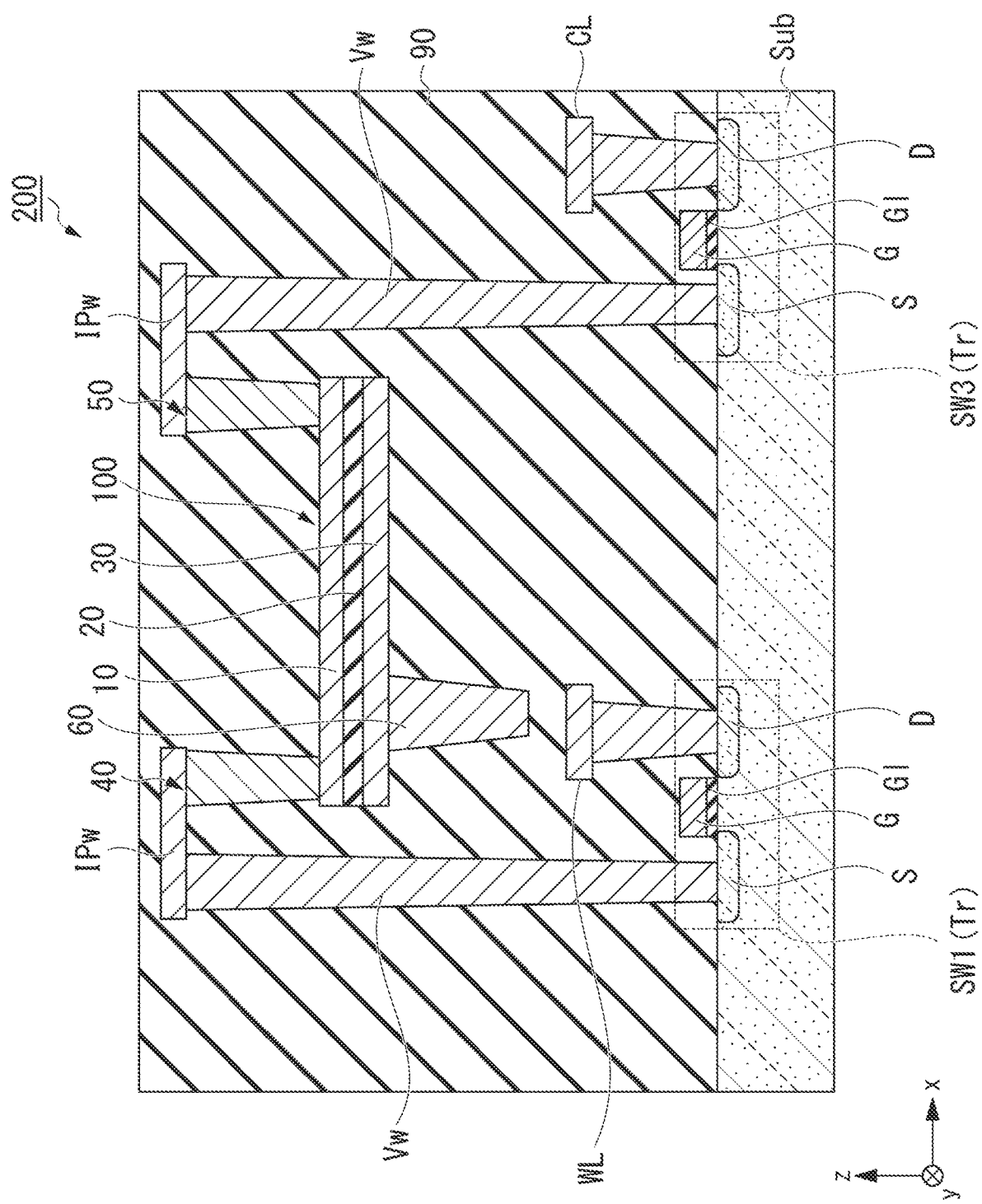
FIG. 3 is a cross-sectional view of a vicinity of a magnetic domain wall moving element of the magnetic array according to the first embodiment.

FIG. 3 is a cross-sectional view of a vicinity of the magnetic domain wall moving element 100 of the accumulation area 1 according to the first embodiment. FIG. 3 is a cross section of one magnetic domain wall moving element 100 in FIG. 2 taken along an xz plane passing through a center of a width of a magnetic domain wall moving layer 10 in a y direction.

The first switching element SW1 and the second switching element SW2 shown in FIG. 3 are transistors Tr. The transistor Tr has a gate electrode G, a gate insulating film GI, and a source S and a drain D formed on a substrate Sub. The source S and the drain D are defined by a direction of the current flow, and both are activation areas of a semiconductor. FIG. 3 only shows an example, and a positional relationship between the source S and the drain D may be reversed. The substrate Sub is, for example, a semiconductor substrate. The third switching element SW3 is electrically connected to the third wiring RL and is, for example, at a position shifted in the y direction in FIG. 3.

The transistor Tr, the first wiring WL, the second wiring CL, the third wiring RL, and the magnetic domain wall moving element 100 are connected by the via wiring Vw extending in the z direction or an in-plane wiring IPw extending in any direction in an xy plane. The via wiring Vw and the in-plane wiring IPw contain a conductive material.

An insulation layer 90 is formed between different layers in the z direction, except for the via wiring Vw.

The insulation layer 90 is an insulation layer that insulates between wirings of multilayer wirings and between elements. The magnetic domain wall moving element 100 and the transistor Tr are electrically separated by the insulation layer 90 except for the via wiring Vw. The insulation layer 90 is, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$), and the like.

Figure 4:
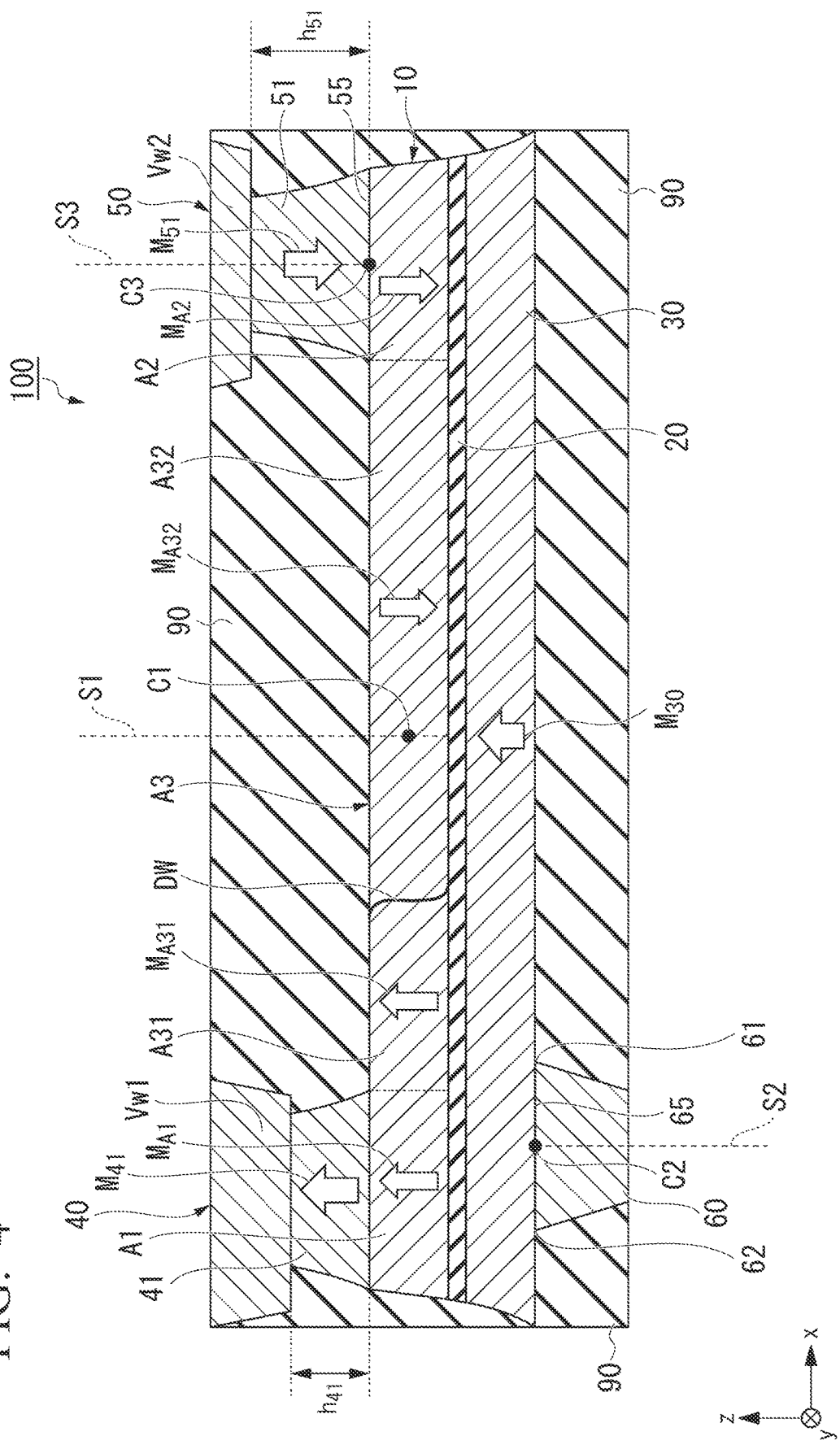
FIG. 4 is a cross-sectional view of the magnetic domain wall moving element according to the first embodiment.
Figure 5:
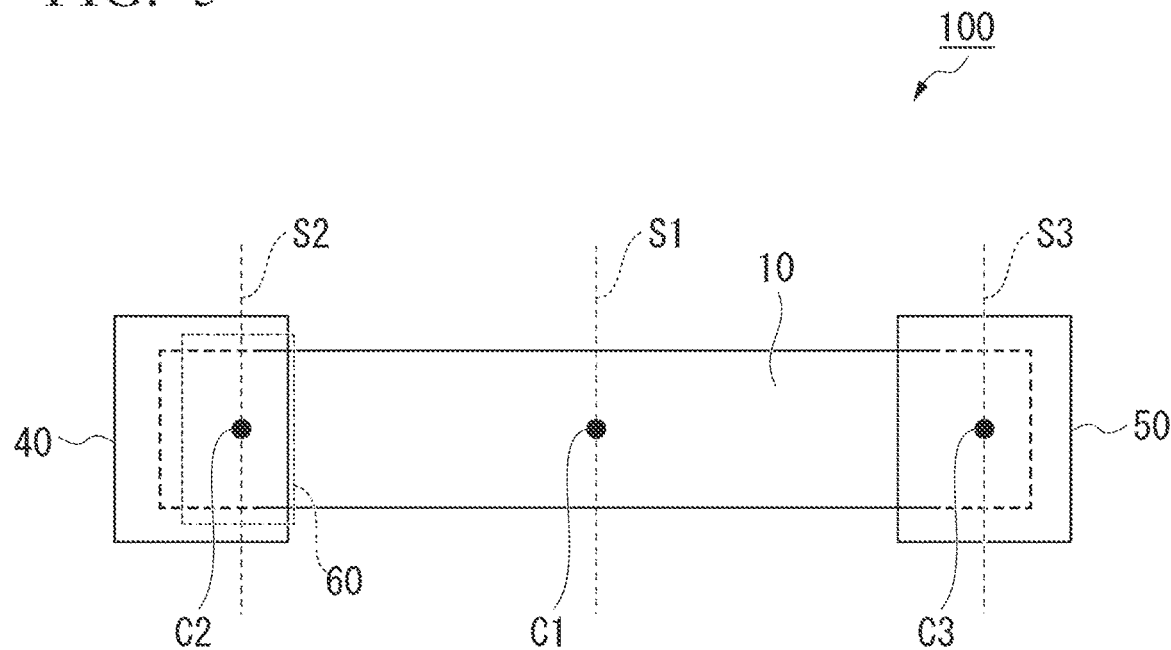
FIG. 5 is a plan view of the magnetic domain wall moving element according to the first embodiment.

FIG. 4 is a cross-sectional view of the magnetic domain wall moving element 100 taken along the xz plane passing through the center of the magnetic domain wall moving layer 10 in the y direction. An arrow shown in FIGS. is an example of an orientation direction of magnetization of a ferromagnetic material. FIG. 5 is a plan view of the magnetic domain wall moving element 100, which is viewed in the z direction.

The magnetic domain wall moving element 100 includes, for example, the magnetic domain wall moving layer 10, a non-magnetic layer 20, a reference layer 30, a first electrode 40, a second electrode 50, and a third electrode 60. At least one of the plurality of magnetic domain wall moving elements included in the accumulation area 1 is the magnetic domain wall moving element 100 shown in FIGS. 4 and 5.

The magnetic domain wall moving layer 10 extends in the x-direction. The magnetic domain wall moving layer 10 has a length in the x direction longer than a length in the y direction when viewed in the z direction. The magnetic domain wall moving layer 10 has two magnetic domains inside and a magnetic domain wall DW at a boundary between the two magnetic domains. The magnetic domain wall moving layer 10 is, for example, a layer in which information can be magnetically recorded according to a change in the magnetic state. The magnetic domain wall moving layer 10 is also called an analog layer or a magnetic recording layer.

The magnetic domain wall moving layer 10 has a first area A1, a second area A2, and a third area A3.

The first area A1 is an area in which an orientation direction of a magnetization $M_{A1}$ is fixed in one direction. The fixed magnetization means that the magnetization is not reversed in a normal operation of the magnetic domain wall moving element 100 (no external force beyond assumption is applied). The first area A1 is, for example, an area of the magnetic domain wall moving layer 10 that overlaps a first magnetization fixed layer 41 when viewed in the z direction. The magnetization $M_{A1}$ of the first area A1 is fixed by, for example, a magnetization $M_{A1}$ of the first magnetization fixed layer 41.

The second area A2 is an area in which an orientation direction of a magnetization $M_{A2}$ is fixed in one direction. The orientation direction of the magnetization $M_{A2}$ in the second area A2 is different from the orientation direction of the magnetization $M_{A1}$ in the first area A1. The orientation direction of the magnetization $M_{A2}$ in the second area A2 is, for example, opposite to the orientation direction of the magnetization $M_{A1}$ in the first area A1. The second area A2 is, for example, an area of the magnetic domain wall moving layer 10 that overlaps a second magnetization fixed layer 51 when viewed in the z direction. The magnetization $M_{A2}$ of the second area A2 is fixed by, for example, the magnetization $M_{51}$ of the second magnetization fixed layer 51.

The third area A3 is an area of the magnetic domain wall moving layer 10 other than the first area A1 and the second area A2. The third area A3 is, for example, an area sandwiched between the first area A1 and the second area A2 in the x direction.

The third area A3 is an area in which a direction of magnetization changes and the magnetic domain wall DW can move. The third area A3 is called the magnetic domain wall movable area. The third area A3 has a first magnetic domain A31 and a second magnetic domain A32. The orientation directions of magnetization of the first magnetic domain A31 and the second magnetic domain A32 are opposite to each other. A boundary between the first magnetic domain A31 and the second magnetic domain A32 is the magnetic domain wall DW. The magnetization $M_{A31}$ of the first magnetic domain A31 is, for example, oriented in the same direction as the magnetization $M_{A1}$ of the first area A1. The magnetization $M_{A32}$ of the second magnetic domain A32 is, for example, oriented in the same direction as the magnetization $M_{A2}$ of the adjacent second area A2. In principle, the magnetic domain wall DW moves within the third area A3 and does not enter the first area A1 and the second area A2.

When a volume ratio between the first magnetic domain A31 and the second magnetic domain A32 in the third area A3 changes, the magnetic domain wall DW moves. The magnetic domain wall DW is moved by causing a write current to flow in the x direction of the third area A3, applying an external magnetic field to the third area A3, or the like. For example, when a write current in the +x direction (for example, a current pulse) is applied to the third area A3, since electrons flow in an −x direction opposite to the current, the magnetic domain wall DW moves in the −x direction. When a current flows from the first magnetic domain A31 toward the second magnetic domain A32, electrons spin-polarized in the second magnetic domain A32 reverse the magnetization $M_{A31}$ of the first magnetic domain A31. The magnetic domain wall DW moves in the −x direction by reversing the magnetization $M_{A31}$ of the first magnetic domain A31.

The magnetic domain wall moving layer 10 is composed of a magnetic material. The magnetic domain wall moving layer 10 may be a ferromagnetic material, a ferrimagnetic material, or a combination of these and an antiferromagnetic material whose magnetic state can be changed by an electric current. The magnetic domain wall moving layer 10 preferably contains at least one element selected from a group consisting of Co, Ni, Fe, Pt, Pd, Gd, Tb, Mn, Ge, Ga.

Materials used for the magnetic domain wall moving layer 10 include, for example, a Co and Ni laminated film, a Co and Pt laminated film, a Co and Pd laminated film, an MnGa-based material, a GdCo-based material, and a TbCo-based material. Ferrimagnetic materials such as MnGa-based materials, GdCo-based materials, and TbCo-based materials have small saturation magnetization, and a small threshold current required to move the magnetic domain wall DW. In addition, the Co and Ni laminated film, the Co and Pt laminated film, and the Co and Pd laminated film have a large coercive force and the movement speed of the magnetic domain wall DW slowed down. The antiferromagnetic material is, for example, $Mn_3X$ (X is Sn, Ge, Ga, Pt, Ir, or the like), CuMnAs, $Mn_2Au$, or the like. The magnetic domain wall moving layer 10 can also be made of the same material as the reference layer 30, which will be described below.

A width of the magnetic domain wall moving layer 10 in the y direction is, for example, 70 nm or less. The width of the magnetic domain wall moving layer 10 in the y direction is, for example, 10 nm or more and 70 nm or less. A length of the magnetic domain wall moving layer 10 in the x direction is, for example, 100 nm or more. The length of the magnetic domain wall moving layer 10 in the x direction is, for example, 100 nm or more and 500 nm or less. A thickness of the magnetic domain wall moving layer 10 is, for example, 8 nm or less. The thickness of the magnetic domain wall moving layer 10 is, for example, 1 nm or more and 8 nm or less.

The non-magnetic layer 20 is sandwiched between the magnetic domain wall moving layer 10 and the ferromagnetic layer 30. The non-magnetic layer 20 is laminated on one surface of the reference layer 30.

The non-magnetic layer 20 is made of, for example, a non-magnetic insulator, semiconductor, or metal. The non-magnetic layer 20 is preferably, for example, a non-magnetic insulator. Non-magnetic insulators are, for example, $Al_2O_3$, $SiO_2$, MgO, $MgAl_2O_4$, and materials in which part of Al, Si, and Mg of these are replaced with Zn, Be, and the like. These materials have a large bandgap and excellent insulating properties. When the non-magnetic layer 20 is made of a non-magnetic insulator, the non-magnetic layer 20 is a tunnel barrier layer. Non-magnetic metals are, for example, Cu, Au, Ag, and the like. Non-magnetic semiconductors are, for example, Si, Ge, $CuInSe_2$, $CuGaSe_2$, $Cu(In, Ga)Se_2$, and the like.

A thickness of the non-magnetic layer 20 is, for example, 20 Å or more, and may also be 25 Å or more.

The reference layer 30 and the magnetic domain wall moving layer 10 sandwich the non-magnetic layer 20 therebetween. The reference layer 30 is located at a position at which at least a portion overlaps the third area A3 in the z direction. The reference layer 30 is, for example, closer to the substrate Sub than the magnetic domain wall moving layer 10.

A magnetization of the reference layer 30 is more difficult to reverse than a magnetization of the third area A3 of the magnetic domain wall moving layer 10. The magnetization of the reference layer 30 does not change its direction and is fixed when an external force enough to reverse the magnetization of the third area A3 is applied. The reference layer 30 may be referred to as a fixed layer in some cases.

The reference layer 30 contains a ferromagnetic material. The reference layer 30 contains, for example, a material that can easily obtain a coherent tunnel effect between the magnetic domain wall moving layers 10. The reference layer 30 contains, for example, a metal selected from a group consisting of Cr, Mn, Co, Fe and Ni, an alloy containing one or more of these metals, and an alloy containing these metals and at least one or more elements of B, C, and N, and the like. The reference layer 30 is, for example, Co—Fe, Co—Fe—B, or Ni—Fe.

The reference layer 30 may be, for example, a Heusler alloy. Heusler alloys are half-metals and have high spin polarization. A Heusler alloy is an intermetallic compound having a chemical composition of XYZ or $X_2YZ$, where X is a Co, Fe, Ni, or Cu group transition metal element or noble metal element on a periodic table, Y is a Mn, V, Cr, or Ti group transition metal or an element species of X, and Z is a typical element of III to V groups. Examples of Heusler alloys include $Co_2FeSi$, $Co_2FeGe$, $Co_2FeGa$, $Co_2MnSi$, $Co_2Mn_{1-a}Fe_aAl_bSi_{1-b}$, $Co_2FeGe_{1-c}Ga_c$, and the like.

Each of the reference layer 30 and the non-magnetic layer 20 is, for example, longer than the third area A3 in the x direction. A portion where the reference layer 30 and the third area A3 face each other with the non-magnetic layer 20 sandwiched therebetween is responsible for a resistance change of the magnetic domain wall moving element 100.

When lengths of the reference layer 30 and the non-magnetic layer 20 in the x direction are longer than a length of the third area in the x direction, it is easy to divide a resistance change width of the magnetic domain wall moving element 100 into multiple values.

The reference layer 30 is, for example, longer than the magnetic domain wall moving layer 10 in the x-direction. When the reference layer 30 overlaps an entirety of the magnetic domain wall moving layer 10 when viewed in the z-direction, a heat dissipation of the magnetic domain wall moving layer 10 is improved. As a result, a stability of the magnetization $M_{A1}$ of the first area A1 and the magnetization $M_{A2}$ of the second area A2 is enhanced, and a reliability of data of the magnetic domain wall moving element 100 is enhanced.

A width of the reference layer 30 in the y direction is, for example, 80 nm or less. The width of the reference layer 30 in the y direction is, for example, 10 nm or more and 80 nm or less. A length of the reference layer 30 in the x direction is, for example, 100 nm or more. The length of the reference layer 30 in the x direction is, for example, 100 nm or more and 600 nm or less. A thickness of the reference layer 30 is, for example, 10 nm or less. The thickness of the reference layer 30 is, for example, 1 nm or more and 10 nm or less.

The first electrode 40 is connected to the magnetic domain wall moving layer 10. The first electrode 40 is connected to the first area A1 of the magnetic domain wall moving layer 10. The first electrode 40 is a write electrode used when a write current is applied to the magnetic domain wall moving element 100. The write current flows between the first electrode 40 and the second electrode 50.

Figure 6:
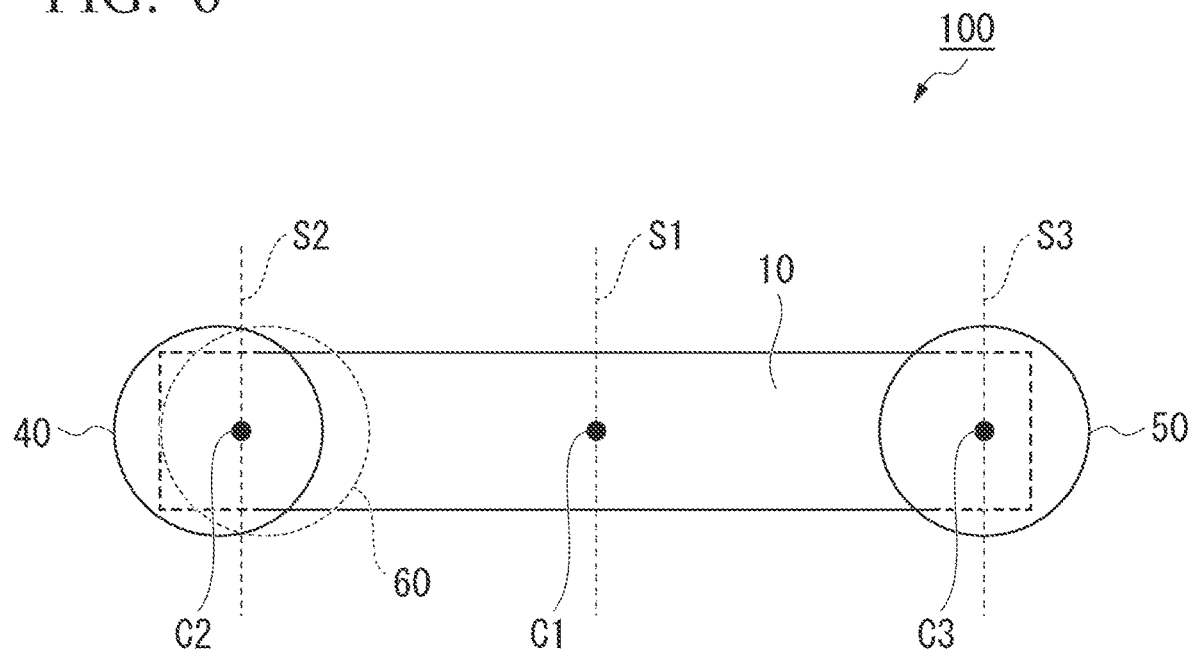
FIG. 6 is a plan view of another example of the magnetic domain wall moving element according to the first embodiment.

A shape of the first electrode 40 is not particularly limited. FIG. 5 shows an example in which the shape of the first electrode 40 in planar view is rectangular when viewed in the z direction, but it may be circular as shown in FIG. 6. FIG. 6 is a plan view of another example of the magnetic domain wall moving element 100 according to the first embodiment. The shape of the first electrode 40 in planar view, which is viewed in the z-direction, is, for example, rectangular, circular, elliptical, or the like.

The first electrode 40 has, for example, a first magnetization fixed layer 41 and a via wiring Vw1.

The first magnetization fixed layer 41 is connected to the first area A1, and the magnetization $M_{A1}$ of the first magnetization fixed layer 41 fixes the magnetization MAI of the first area A1.

The first magnetization fixed layer 41 is, for example, a ferromagnetic material. The first magnetization fixed layer 41 can be made by, for example, applying the same material as the magnetic domain wall moving layer 10 or the reference layer 30. In addition, the first magnetization fixed layer 41 may have a plurality of layers and have a synthetic antiferromagnetic structure (SAF structure).

The synthetic antiferromagnetic structure consists of two magnetic layers that sandwich a non-magnetic spacer layer therebetween. The magnetic layer includes, for example, a ferromagnetic material and may include an antiferromagnetic material such as IrMn or PtMn. The spacer layer includes, for example, at least one selected from a group consisting of Ru, Ir, and Rh.

In addition, the first magnetization fixed layer 41 is not limited to a ferromagnetic material. When the first magnetization fixed layer 41 is not a ferromagnetic material, a current density of a current flowing through the magnetic domain wall moving layer 10 changes rapidly in the area overlapping the first magnetization fixed layer 41, and thereby the movement of the magnetic domain wall DW is limited and the magnetization of the first area A1 is fixed.

The via wiring Vw1 is connected to the first magnetization fixed layer 41. The via wiring Vw1 extends from the first magnetization fixed layer 41 in the z-direction. When the via wiring Vw1 extending in the z-direction is connected to the first magnetization fixed layer 41, an Oersted magnetic field generated when a current flows through the wiring has a small effect on the magnetization of the reference layer 30 and the magnetic domain wall moving layer 10 than when the in-plane wiring extending in any direction in the xy plane is connected to the first magnetization fixed layer 41.

The second electrode 50 is connected to the magnetic domain wall moving layer 10 at a position different from that of the first electrode 40. The second electrode 50 is connected to the second area A2 of the magnetic domain wall moving layer 10. A connection surface between the second electrode 50 and the magnetic domain wall moving layer 10 is called a second connection surface 55. The second electrode 50 is a common electrode used when a write current is applied to the magnetic domain wall moving element 100 and when a read current is applied to the magnetic domain wall moving element 100.

A shape of the second electrode 50 is not particularly limited. FIG. 5 shows an example in which a planar shape of the first electrode 40 is rectangular when viewed in the z direction, but it may be circular as shown in FIG. 6. A planar shape of the second electrode 50 when viewed in the z direction is, for example, rectangular, circular, elliptical, or the like. A planar shape of the second connection surface 55 is also, for example, rectangular, circular, elliptical, or the like.

The second electrode 50 has, for example, a second magnetization fixed layer 51 and a via wiring Vw2.

The second magnetization fixed layer 51 is connected to the second area A2, and the magnetization $M_{51}$ of the second magnetization fixed layer 51 fixes the magnetization $M_{A2}$ of the second area A2. The second magnetization fixed layer 51 can be made by using the same material as that of the first magnetization fixed layer 41. The second magnetization fixed layer 51 may have the synthetic antiferromagnetic structure (SAF structure).

A film thickness $h_{51}$ of the second magnetization fixed layer 51 is thicker than a film thickness $h_{41}$ of the first magnetization fixed layer 41. Coercive forces of the second magnetization fixed layer 51 and the first magnetization fixed layer 41 differ by changing the film thicknesses of the second magnetization fixed layer 51 and the first magnetization fixed layer 41, it is easy to set an orientation direction of the magnetization $M_{51}$ of the second magnetization fixed layer 51 and an orientation direction of the magnetization $M_{41}$ of the first magnetization fixed layer 41 to different directions at the time of manufacture. In addition, the magnetization $M_{51}$ of the second magnetization fixed layer 51 is easy to be unstable because both a write current and a read current flow therethrough. By increasing the film thickness $h_{51}$ of the second magnetization fixed layer 51, a stability of the magnetization $M_{51}$ of the second magnetization fixed layer 51 can be enhanced.

The via wiring Vw2 is connected to the second magnetization fixed layer 51. The via wiring Vw2 extends from the second magnetization fixed layer 51 in the z-direction. By extending the via wiring Vw2 in the z-direction, the Oersted magnetic field generated from the via wiring Vw2 can have a reduced effect on the magnetization of the reference layer 30 and the magnetic domain wall moving layer 10.

The third electrode 60 is connected to the reference layer 30. A connection surface between the third electrode 60 and the reference layer 30 is called a first connection surface 65. The third electrode 60 is a read electrode used when a read current is applied to the magnetic domain wall moving element 100. A read current flows between the second electrode 50 and the third electrode 60. The third electrode 60 contains a conductive material. The third electrode 60 may be a via wiring extending in the z direction.

A center C2 of the first connection surface 65 in the x direction is located farther from the second electrode 50 in the x direction than a center C1 of the third area A3 in the x direction center C1. That is, the center C1 of the third area A3 is between the center C2 of the first connection surface 65 and a center C3 of the second connection surface 55 in the x-direction. For example, if a virtual plane passing through the center C1 and extending in the y and z directions is set as a first virtual plane S1, a virtual plane passing through the center C2 and extending in the y and z directions is set as a second virtual plane S2, and a virtual plane passing through the center C3 and extending in the y and z directions is set as a third virtual plane S3, the first virtual plane S1 is sandwiched between the second virtual plane S2 and the third virtual plane S3 in the x direction. If the third electrode 60 is located at a position that satisfies this relationship, it is possible to suppress an occurrence of a situation in which an amount of voltage drop varies depending on a path of the read current.

In addition, in the magnetic domain wall moving element 100 shown in FIG. 4, a first end 61 of the first connection surface 65 closest to the second electrode 50 is located at a position farther from the second electrode 50 than the center C1 in the x direction. That is, the third electrode 60 is located at a position farther from the second electrode 50 than the first virtual plane S1. Moreover, in the magnetic domain wall moving element 100 shown in FIG. 4, the center C2 of the first connection surface 65 is located at a position that it overlaps the first area A1 when viewed in the z direction. In the magnetic domain wall moving element 100, if the third electrode 60 is located at a position that satisfies this relationship, it is possible to further suppress the occurrence of the situation in which the amount of voltage drop varies depending on the path of the read current.

In addition, in the magnetic domain wall moving element 100 shown in FIG. 4, a second end 62 of the first connection surface 65 farthest from the second electrode 50 in the x direction is located at a position that does not overlap the third area A3 when viewed in the z direction. If the magnetic domain wall moving element 100 satisfies the configuration, a flatness of the third area A3 can be enhanced, and the movement of the magnetic domain wall DW can be smooth.

The third electrode 60 is, for example, shorter than the reference layer 30 in the x-direction. The third electrode 60 may be, for example, longer than the reference layer 30 in the x-direction. If a length of the third electrode 60 in the x direction is shorter than the length of the reference layer 30 in the x direction, an integration of the magnetic domain wall moving element 100 can be enhanced. If the length of the third electrode 60 in the x direction is longer than the length of the reference layer 30 in the x direction, the heat dissipation of the magnetic domain wall moving element 100 can be enhanced.

The reference layer 30, the non-magnetic layer 20, and the magnetic domain wall moving layer 10 are laminated on the third electrode 60 and the insulation layer 90. Before these layers are laminated, surfaces of the third electrode 60 and the insulation layer 90 are chemical mechanical (CMP) polished. Since constituent materials of the third electrode 60 and the insulation layer 90 are different, a slight step may be formed at an interface between the third electrode 60 and the insulation layer 90. If the second end 62 is positioned so as not to overlap the third area A3 when viewed in the z direction, it is possible to prevent this step from reducing the flatness of the third area A3.

The magnetic domain wall moving element 100 may have layers other than the magnetic domain wall moving layer 10, the non-magnetic layer 20, and the reference layer 30. For example, a magnetic layer may be provided on a surface of the reference layer 30 opposite to the non-magnetic layer 20 via a spacer layer. The reference layer 30, the spacer layer, and the magnetic layer form the synthetic antiferromagnetic structure (SAF structure). In addition, a seed layer may be provided on a surface of the magnetic layer opposite to the spacer layer.

The magnetization direction of each layer of the magnetic domain wall moving element 100 can be confirmed by, for example, measuring a magnetization curve. The magnetization curve can be measured using, for example, Magneto Optical Kerr Effect (MOKE). The measurement by MOKE is a measurement method which is performed by using a magneto-optical effect (magnetic Kerr effect) in which linearly polarized light is caused to be incident on an object to be measured and a rotation of the polarization direction occurs.

The magnetic domain wall moving element 100 is formed by a laminating process of each layer and a process of processing a part of each layer into a predetermined shape. A sputtering method, a chemical vapor deposition (CVD) method, an electron beam vapor deposition method (EB vapor deposition method), an atomic laser deposition method, or the like can be used for laminating each layer. Each layer can be processed by using photolithography and etching (for example, Ar etching).

Next, a write operation of a signal in the magnetic array MA and a read operation of a signal from the magnetic array MA will be described.

First, the write operation of a signal in the magnetic array MA will be described. The write operation is performed by, for example, the processor executing an operation program stored in the control unit 6.

First, the pulse application device 3 selects a magnetic domain wall moving element 100 to which a pulse is applied according to the operation program. When the magnetic array MA is used as a magnetic memory, the magnetic domain wall moving element 100 to which a pulse is applied is an element for storing data. When the magnetic array MA is used as a neural network, the magnetic domain wall moving element 100 to which a pulse is applied is an element that changes a weight according to learning.

The control unit 6 controls to which magnetic domain wall moving element 100 of the plurality of magnetic domain wall moving elements 100 the pulse is applied. The control unit 6 turns on a first switching element SW1 and a second switching element SW2 connected to the magnetic domain wall moving element 100 to which a pulse is applied, and turns off a third switching element SW3. In addition, it turns off at least one of a first switching element SW1 and a second switching element SW2 connected to a magnetic domain wall moving element 100 to which no pulse is applied.

Then, the pulse application device 3 outputs a write pulse toward the magnetic domain wall moving element 100 according to the operation program. The write pulse is applied between the first electrode 40 and the second electrode 50 along the magnetic domain wall moving layer 10 of the magnetic domain wall moving element 100. The write pulse may be a rectangular wave, a spike wave, or a wave of any other waveform. By changing the number of times the write pulse is applied, the magnitude, or the like, a position of the magnetic domain wall DW is changed, and a signal is written to a specific magnetic domain wall moving element 100.

Subsequently, the read operation of a signal from the magnetic array MA will be described. The read operation is performed by, for example, the processor executing the operation program stored in the control unit 6.

First, the pulse application device 3 selects a magnetic domain wall moving element 100 to which a read pulse is applied according to the operation program. When the magnetic array MA is used as a magnetic memory, the magnetic domain wall moving element 100 to which a read pulse is applied is an element for reading data. When the magnetic array MA is used as a neural network, the application of a read pulse to a predetermined magnetic domain wall moving element 100 corresponds to calculation of a product of an input and a weight. That is, when the magnetic array MA is used as a neural network, the read operation is an identification calculation of the neural network.

The control unit 6 controls to which magnetic domain wall moving element 100 of the plurality of magnetic domain wall moving elements 100 a pulse is applied. The control unit 6 turns on a third switching element SW3 and a second switching element SW2 connected to the magnetic domain wall moving element 100 to which a pulse is applied, and turns off a first switching element SW1. In addition, it turns off at least one of a third switching element SW3 and a second switching element SW2 connected to a magnetic domain wall moving element 100 to which no pulse is applied.

Next, the pulse application device 3 applies a read pulse to a predetermined magnetic domain wall moving element 100 according to the operation program. A read pulse is applied, for example, between the third electrode 60 and the second electrode 50. A voltage of the read pulse is a voltage at which a current density below a critical current density required to move the magnetic domain wall DW of the magnetic domain wall moving layer 10 is obtained. That is, the read pulse does not move the magnetic domain wall DW.

The resistance detection device 4 detects a resistance of the magnetic domain wall moving element 100 to which the read pulse is applied. The output unit 5 outputs, for example, the calculation result to the outside. It is possible to read a signal from a specific magnetic domain wall moving element 100 in such a procedure.

Here, the magnetic domain wall moving element 100 according to the present embodiment has a small difference in the passing distance in the x direction for each path of the read current, and can suppress a magnitude of the effective read voltage applied to the non-magnetic layer 20 from largely varying depending on a position in the x direction. A reason for this will be described in detail with reference to FIGS. 7 and 8.

Figure 7:
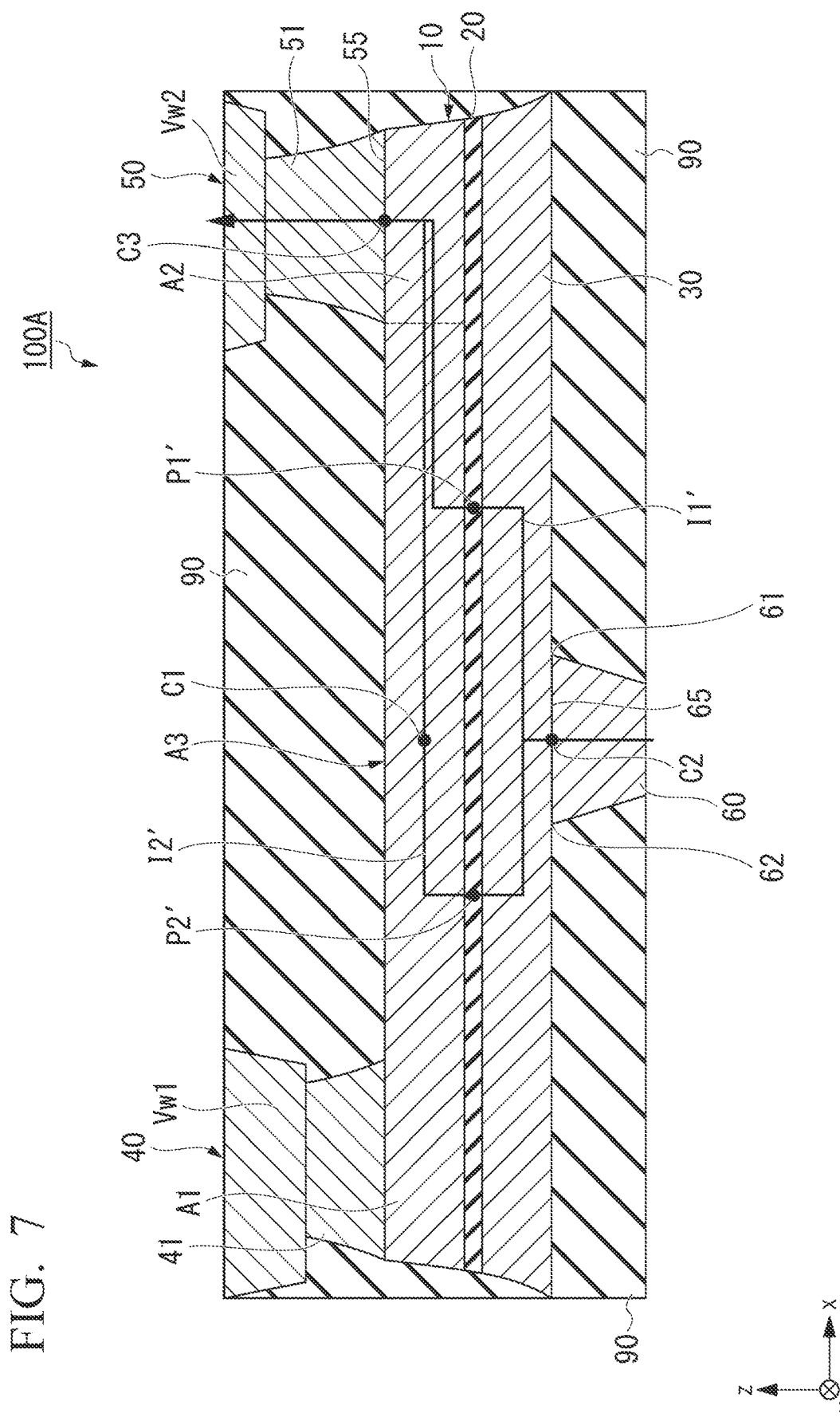
FIG. 7 is a diagram which shows an example of a read current path of a magnetic domain wall moving element according to a comparative example.

FIG. 7 is a diagram which shows an example of a path of a read current of a magnetic domain wall moving element 100A according to a comparative example. As shown in FIG. 7, a read current applied from the third electrode 60 to the reference layer 30 spreads along the reference layer 30, flows to the magnetic domain wall moving layer 10 and the second electrode 50 through the non-magnetic layer 20. For this reason, an example of the path of the read current is, for example, a first current path I1' and a second current path I2'.

The second current path I2' has a longer passing distance in the x direction than the first current path I1'. The amount of voltage drop when the read current flows through the second current path I2' is different from the amount of voltage drop when the read current flows through the first current path I1'. For this reason, an effective read voltage applied to the first point P1' of the non-magnetic layer 20 is greater than an effective read voltage applied to the second point P2' of the non-magnetic layer 20.

For example, a case where the second electrode 50 is set to be at −5V and the third electrode 60 is set to be at 5V will be described in detail. Since the reference layer 30 has a resistance in the x direction, a potential of the reference layer 30 decreases as a distance from the third electrode 60 increases. Therefore, the potential of the reference layer 30 at a vicinity of each of the first point P1' and the second point P2' is, for example, 4V. Similarly, since the magnetic domain wall moving layer 10 has a resistance in the x-direction, an absolute value of a potential of the magnetic domain wall moving layer 10 decreases as a distance from the second electrode 50 increases. For this reason, the potential of the magnetic domain wall moving layer 10 at the vicinity of the first point P1' is, for example, −4V and the potential of the magnetic domain wall moving layer 10 at the vicinity of the second point P2' is, for example, −2V. In this case, the effective read voltage applied to the first point P1' is 8V, while the effective read voltage applied to the second point P2' is 6V. That is, the read voltage effectively applied to the non-magnetic layer 20 varies depending on the position in the x direction.

Such a problem was found according to thinning and narrowing of the magnetic domain wall moving layer 10 and the reference layer 30 and an increase of a current path flowing along an in-plane of the magnetic domain wall moving layer 10 and the reference layer 30. This is because a large voltage drop does not occur in the magnetic domain wall moving layer 10 and the reference layer 30 when cross-sectional areas of the magnetic domain wall moving layer 10 and the reference layer 30 are sufficiently large. In addition, this is because a component of a read current flowing in the x direction is small and the voltage drop at the magnetic domain wall moving layer 10 and the reference layer 30 is not a big problem when a length of the reference layer 30 in the x direction is sufficiently shorter than a length of the magnetic domain wall moving layer 10 in the x direction. On the other hand, the thinning and narrowing of the magnetic domain wall moving layer 10 and the reference layer 30 is a direction required as a development policy of the magnetic domain wall moving element, and the problem described above will be a problem in future development.

In addition, when a read voltage V(x) effectively applied to the non-magnetic layer 20 varies depending on the position in the x direction, there is also a problem that a linearity of the magnetic domain wall moving element 100A deteriorates. The linearity of the magnetic domain wall moving element 100A means a linearity of an output with respect to an input to the magnetic domain wall moving element 100A. Since the position of the magnetic domain wall DW moves according to the input to the magnetic domain wall moving element 100A, the position of the magnetic domain wall DW in the x direction corresponds to the input to the magnetic domain wall moving element 100A.

In addition, the output from the magnetic domain wall moving element 100A corresponds to a read current value read from the magnetic domain wall moving element 100A.

A resistance of the magnetic domain wall moving element 100A varies depending on the position of the magnetic domain wall DW in the x direction. When the magnetic domain wall DW moves in the x direction by one step, the resistance of the magnetic domain wall moving element 100A changes by ΔR, and a conductance value also changes by ΔG. A movement width of the magnetic domain wall DW for one step means a width by which the magnetic domain wall DW moves when a write pulse of a specific number or magnitude is applied.

An amount of change ΔI in the read current when the magnetic domain wall DW moves by one step is obtained by a product of the read voltage V(x) effectively applied to the non-magnetic layer 20 with the width of change in the conductance ΔG when the magnetic domain wall DW moves by one step. For this reason, when the read voltage V(x) effectively applied to the non-magnetic layer 20 varies depending on the position in the x direction, the amount of change ΔI in the read current when the magnetic domain wall DW moves by one step also varies depending on the position of the magnetic domain wall DW in the x direction. That is, the amount of change ΔI in the read current is not constant according to the position of the magnetic domain wall DW in the x direction, and the read current value read from the magnetic domain wall moving element 100A is not linear with respect to the position change of the magnetic domain wall DW in the x direction.

Figure 8:
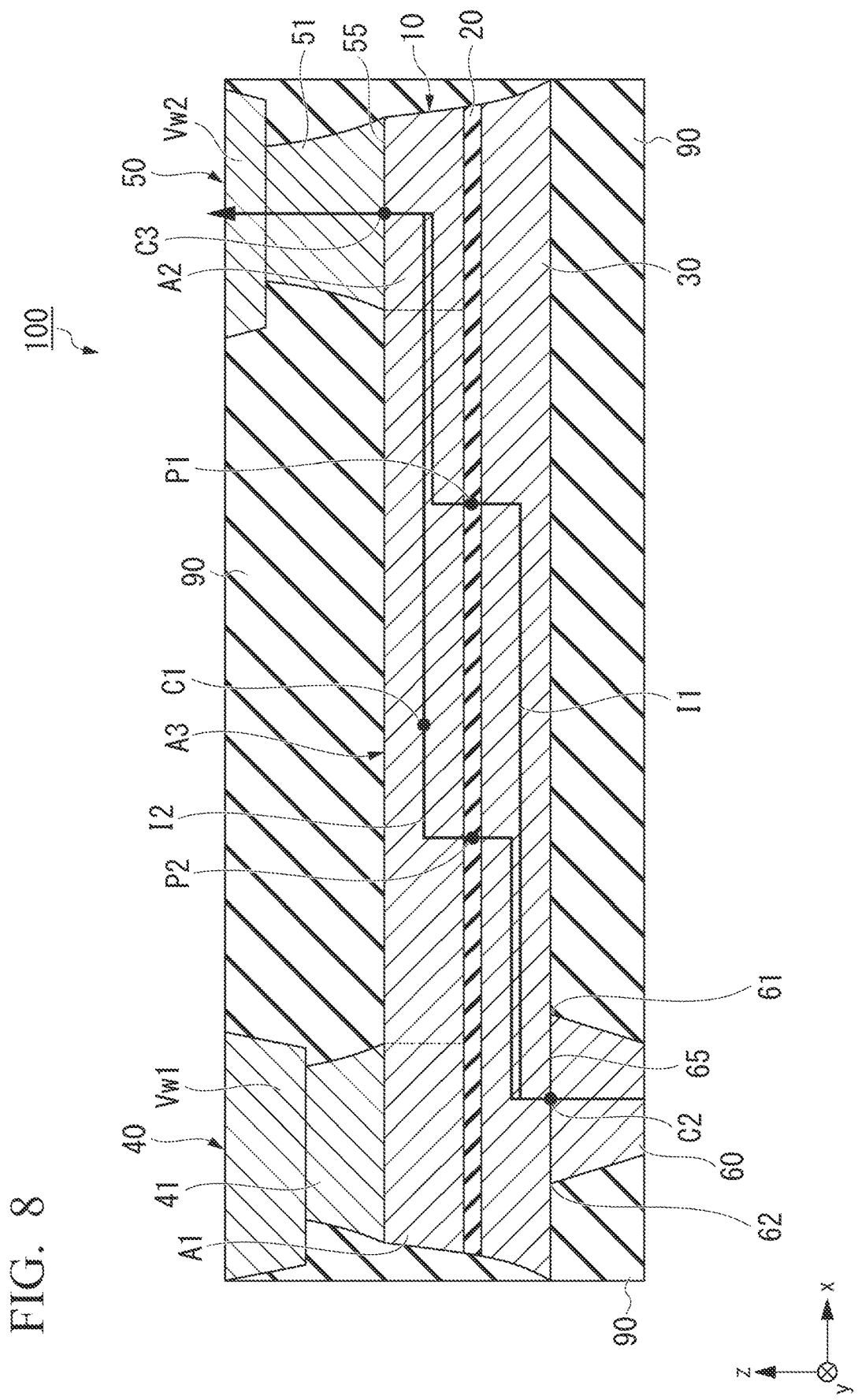
FIG. 8 is a diagram which shows an example of a read current path of the magnetic domain wall moving element according to the first embodiment.

FIG. 8 is a diagram which shows an example of a path of a read current of the magnetic domain wall moving element 100 according to the first embodiment. As an example of a read path of the magnetic domain wall moving element 100, there is, for example, a first current path I1 and a second current path I2. Here, as an example, a case in which the read current flows from the third electrode 60 to the second electrode 50 is exemplified, but the read current may flow from the second electrode 50 to the third electrode 60.

A passing distance of the second current path I2 in the x direction substantially matches that of the first current path I1. That is, the amount of voltage drop when the read current flows through the second current path I2 substantially matches the amount of voltage drop when the read current flows through the first current path I1. For this reason, an effective read voltage applied to a first point P1 of the non-magnetic layer 20 and an effective read voltage applied to the second point P2 of the non-magnetic layer 20 substantially match each other.

For example, a case in which the second electrode 50 is set to −5V and the third electrode 60 is set to 5V will be described in detail. Since the reference layer 30 has a resistance in the x direction, the potential of the reference layer 30 decreases as the distance from the third electrode 60 increases. For this reason, the potential of the magnetic domain wall moving layer 10 in the vicinity of the first point P1 is, for example, 2V, and the potential of the magnetic domain wall moving layer 10 in the vicinity of the second point P2 is, for example, 4V. Similarly, since the magnetic domain wall moving layer 10 has a resistance in the x-direction, the absolute value of the potential of the magnetic domain wall moving layer 10 decreases as the distance from the second electrode 50 increases. For this reason, the potential of the magnetic domain wall moving layer 10 in the vicinity of the first point P1 is, for example, −4V, and the potential of the magnetic domain wall moving layer 10 in the vicinity of the second point P2 is, for example, −2V. In this case, both the effective read voltage applied to the first point P1 and the potential of the magnetic domain wall moving layer 10 in the vicinity of the second point P2 are 6V. That is, the read voltage effectively applied to the non-magnetic layer 20 does not depend on the position in the x-direction.

If the read voltage effectively applied to the non-magnetic layer 20 does not depend on the position in the x-direction, a relatively strong voltage will not be applied to a part of the non-magnetic layer 20, and short-circuiting is difficult to occur.

In addition, a linearity of the magnetic domain wall moving element 100 improves as the read voltage effectively applied to the non-magnetic layer 20 does not depend on the position in the x direction. Therefore, the magnetic domain wall moving element 100 shown in FIG. 8 is superior to the magnetic domain wall moving element 100A shown in FIG. 7 in the linearity of the read current value read from the magnetic domain wall moving element 100 with respect to a position change of the magnetic domain wall DW in the x direction.

Although preferred embodiments of the present invention have been described above, the present invention is not limited to these embodiments.

Figure 9:
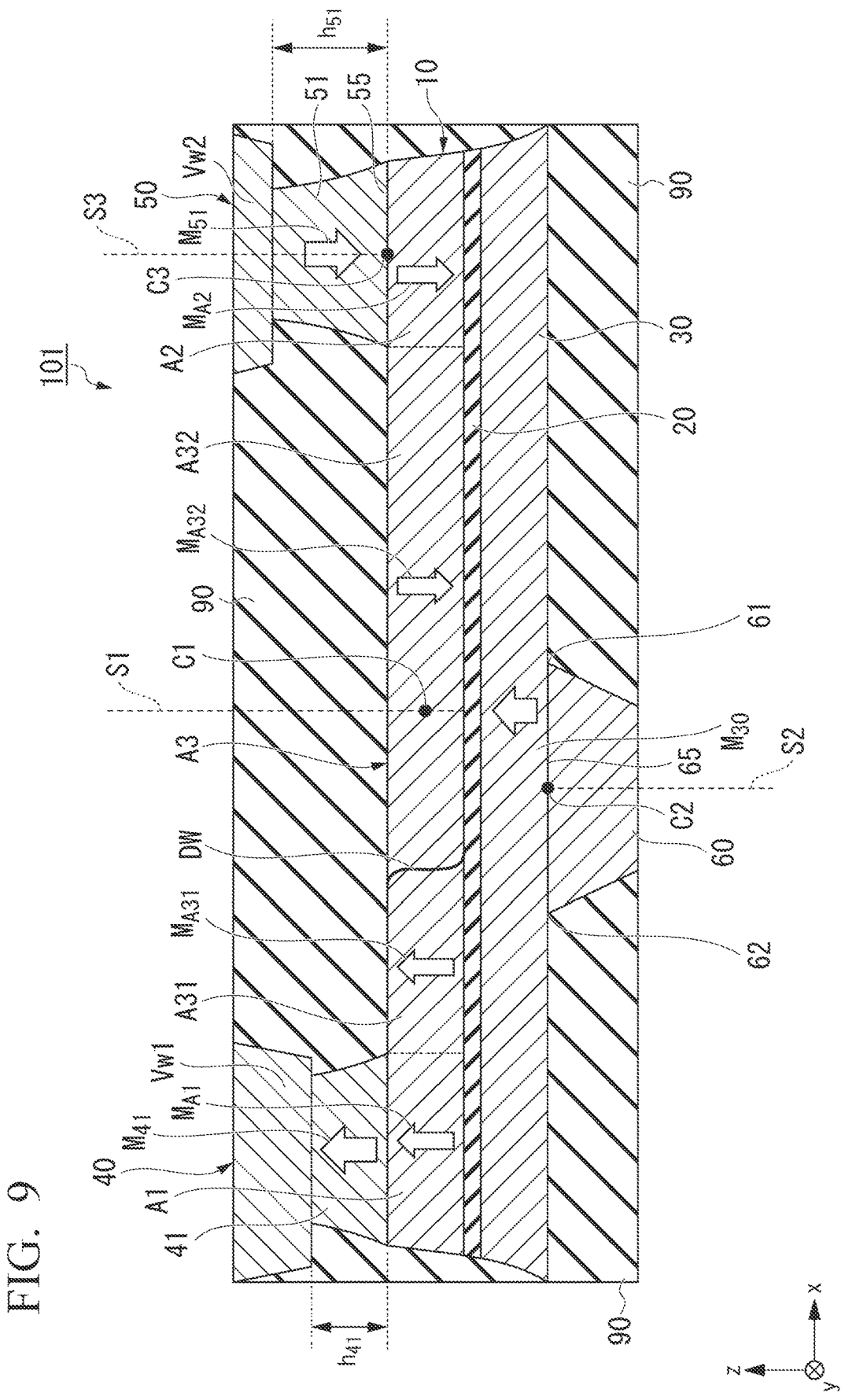
FIG. 9 is a cross-sectional view of a magnetic domain wall moving element according to a first modified example.

For example, FIG. 9 is a cross-sectional view of a magnetic domain wall moving element 101 according to the first modified example. As shown in FIG. 9, a portion of the third electrode 60 may be located at a position at which it overlaps the center C1 when viewed in the z direction.

Figure 10:
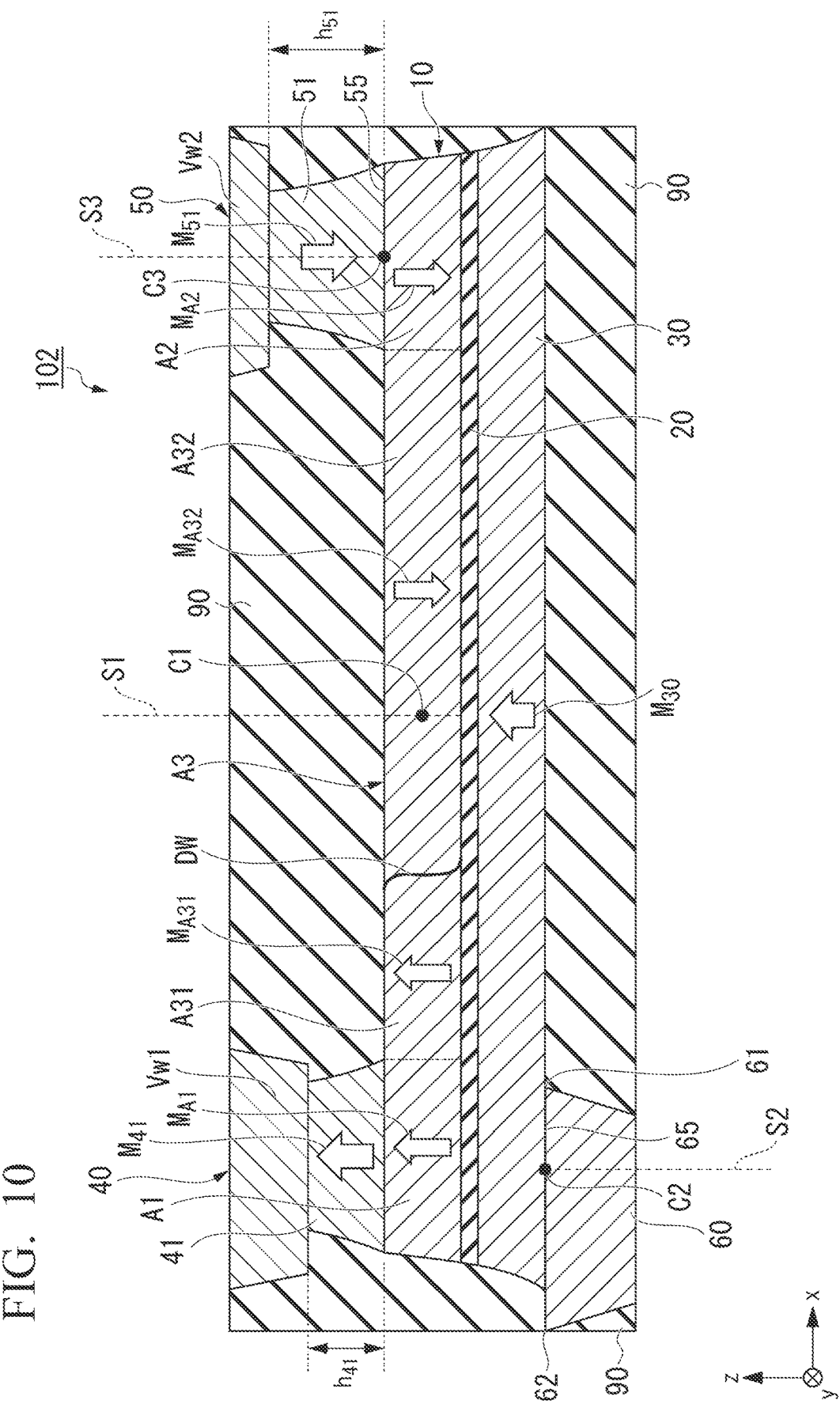
FIG. 10 is a cross-sectional view of a magnetic domain wall moving element according to a second modified example.

In addition, for example, FIG. 10 is a cross-sectional view of the magnetic domain wall moving element 102 according to a second modified example. As shown in FIG. 10, the first end 61 of the third electrode 60 may be located at a position at which it overlaps the first area A1 when viewed in the z direction. When this relationship is satisfied, it is possible to further suppress the situation where the amount of voltage drop varies depending on the path of the read current. In addition, as shown in FIG. 10, the first end 61 may be located at a position at which it does not overlap the third area A3 when viewed in the z direction. When this configuration is satisfied, it is possible to prevent a step between the first end 61 and the insulation layer 90 from reducing the flatness of the third area A3. Moreover, as shown in FIG. 10, the second end 62 of the third electrode 30 may be located at a position at which it does not overlap the reference layer 30 when viewed in the z direction.

Figure 11:
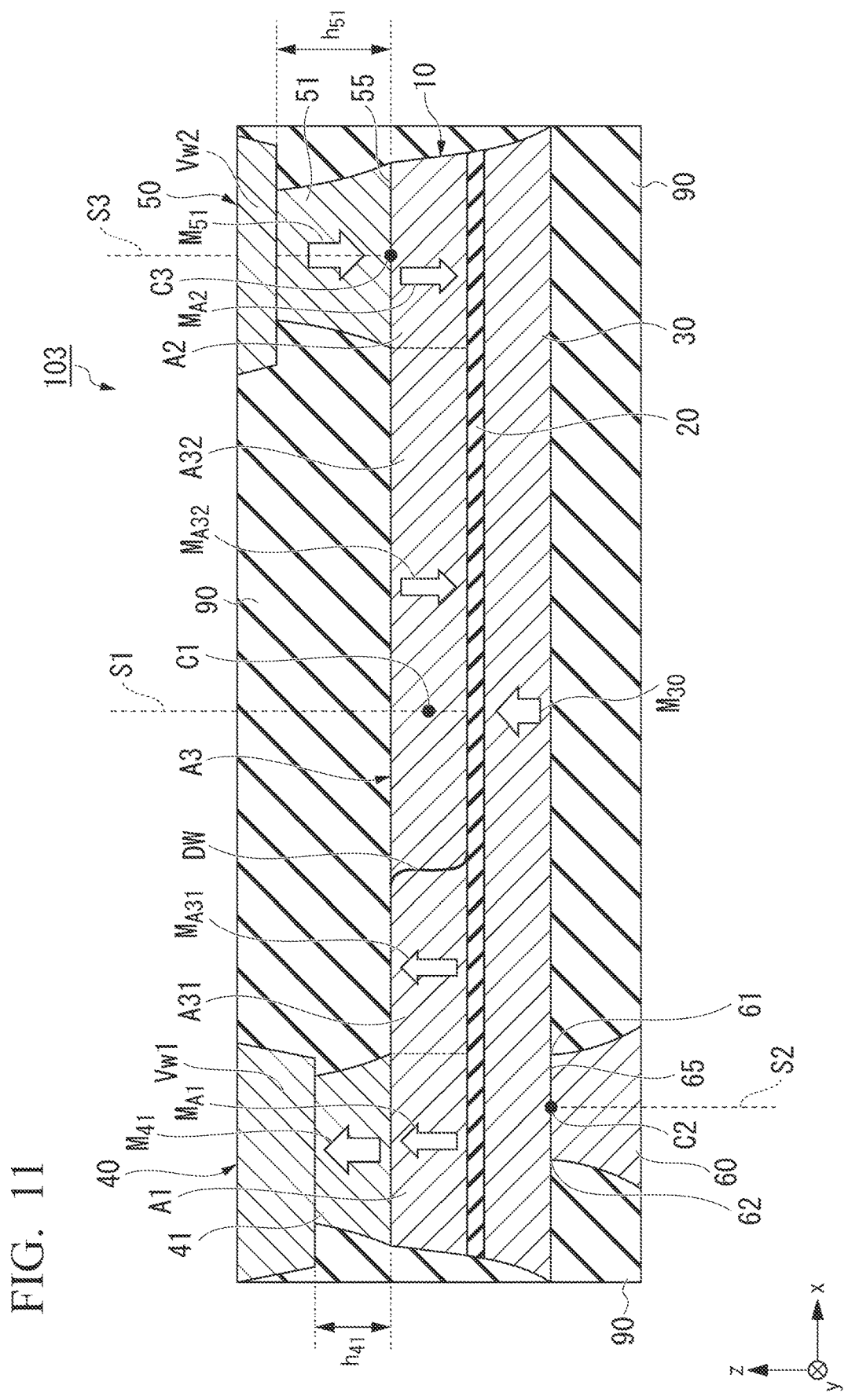
FIG. 11 is a cross-sectional view of a magnetic domain wall moving element according to a third modified example.

In addition, for example, FIG. 11 is a cross-sectional view of the magnetic domain wall moving element 103 according to a third modified example. In the magnetic domain wall moving element 103 according to the third modified example, a cross-sectional shape of the third electrode 60 varies. A width of the third electrode 60 in the x direction may be narrower as it approaches the reference layer 30 as shown in FIG. 11, or may be wider as it is closer to the reference layer 30 as shown in FIG. 4.

Figure 12:
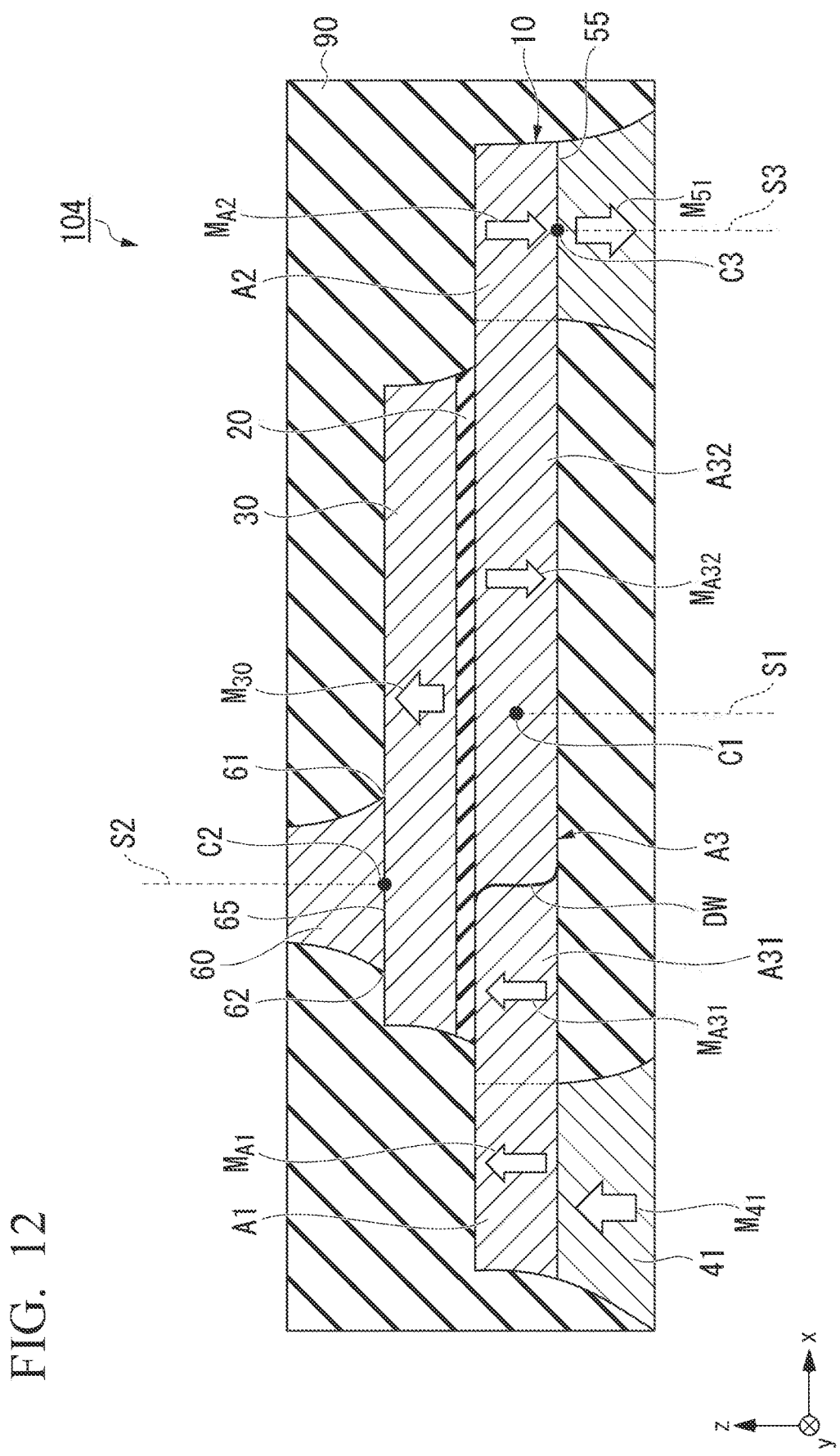
FIG. 12 is a cross-sectional view of a magnetic domain wall moving element according to a fourth modified example.

In addition, for example, FIG. 12 is a cross-sectional view of a magnetic domain wall moving element 104 according to a fourth modified example. The magnetic domain wall moving element 104 shown in FIG. 12 is different from the magnetic domain wall moving element 100 in that the reference layer 30 is located at a position farther from the substrate Sub than the magnetic domain wall moving layer 10. The magnetic domain wall moving element 104 is referred to as a top-pin structure. The magnetic domain wall moving element 100 has the reference layer 30 closer to the substrate Sub than the magnetic domain wall moving layer 10 and is referred to as a bottom-pin structure. A top-pin structure as shown in the magnetic domain wall moving element 104 can also provide the same effect as the bottom-pin structure.

The magnetic array MA according to the present embodiment can be applied to neuromorphic devices.

A neuromorphic device has, for example, a magnetic array MA and an output converter. The output converter has an activation function. The output converter is a resistance detection device 4 and an output unit 5. The output converter converts a result of a sum-of-product calculation output from the second wiring CL according to the activation function.

The neuromorphic device is a device that performs neural network calculation. The neuromorphic device artificially mimics a relationship between neurons and synapses in a human brain.

Figure 13:
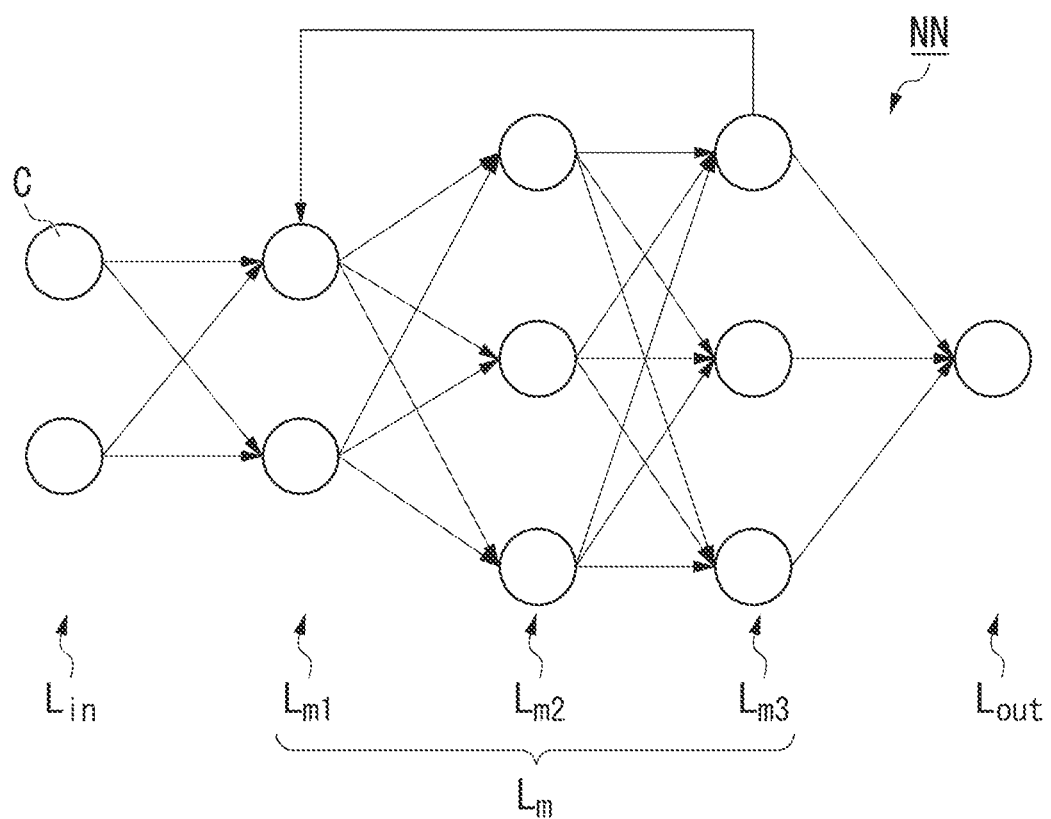
FIG. 13 is a schematic diagram of a neural network.

FIG. 13 is a schematic diagram of a neural network NN. The neural network NN has an input layer $L_{in}$, an intermediate layer $L_m$, and an output layer $L_{out}$. Although FIG. 13 shows an example of three intermediate layers $L_m$, the number of intermediate layers $L_m$, does not matter. Each of the input layer $L_{in}$, the intermediate layer $L_m$, and the output layer $L_{out}$ has a plurality of chips C, each chip C corresponding to a neuron in a brain. Each of the input layer $L_{in}$, the intermediate layer $L_m$, and the output layer $L_{out}$ is connected by a transmission means. The transmission means corresponds to a synapse in the brain. The neural network NN increases a correct answer rate of a problem by the transmission means (synapse) performing learning. Learning is to find knowledge that can be used in the future from information. The neural network NN performs learning by operating while changing a weight applied to the transmission means. The transmission means performs a product calculation that weights input signals and a sum calculation that adds results of the product calculations. That is, the transmission means performs a sum-of-products calculation.

The magnetic array MA can perform the sum-of-products calculation. The magnetic domain wall moving element 100 changes the resistance to multiple values or analog by changing the position of the magnetic domain wall DW. Designing the resistance of the magnetic domain wall moving element 100 and its reciprocal conductance corresponds to giving a weight to the transmission means.

For example, in FIG. 2, a current flows from the third wiring RL to the second wiring CL. A current (output value) output from the second wiring CL varies depending on a conductance (weight) of the magnetic domain wall moving element 100. That is, applying a current from the third wiring RL to the second wiring CL corresponds to a product calculation in the neural network NN. In addition, the second wiring CL is connected to a plurality of magnetic domain wall moving elements 100 belonging to the same column, and the current detected at the end of the second wiring CL is a value obtained by summing the results of product calculation in each magnetic domain wall moving element 100. Therefore, the magnetic array MA functions as a sum-of-products calculator of the neuromorphic device.

As described above, the magnetic domain wall moving element belonging to the magnetic array MA has a high linearity of the read current value with respect to the writing pulse (a movement amount of the magnetic domain wall). Resistance changing elements used for the sum-of-products calculation of the neuromorphic device are required to have a high linearity with respect to an input, and the magnetic domain wall moving element described above is suitable for the neuromorphic device.

Although the preferred embodiments of the present invention have been described above, the present invention is not limited to these embodiments. For example, the characteristic configurations of the respective embodiments may be combined, or part of them may be changed without changing the gist of the invention.

EXPLANATION OF REFERENCES

1 Accumulation area
2 Peripheral area
3 Pulse application device
4 Resistance detection device
5 Output unit
6 Control unit
7 Power supply
10 Magnetic domain wall moving layer
20 Non-magnetic layer
30 Reference layer
40 First electrode
41 First magnetization fixed layer
50 Second electrode
51 Second magnetization fixed layer
55 Second connection surface
60 Third electrode
61 First end
62 Second end
65 First connection surface
90 Insulation layer
100, 100A, 101, 102, 103, 104 Magnetic domain wall moving element
A1 First area
A2 Second area
A3 Third area
WL First wiring
CL Second wiring
RL Third wiring
DW Magnetic domain wall
MA Magnetic array
C1, C2, C3 Center
p1, p1' First point
p2, p2' Second point
S1 First virtual plane
S2 Second virtual plane
S3 Third virtual plane
I1, I1' First current path
I2, I2' Second current path

What is claimed is:

1. A magnetic domain wall moving element comprising:
a magnetic domain wall moving layer;
a reference layer;
a non-magnetic layer sandwiched between the magnetic domain wall moving layer and the reference layer;
a first electrode connected to the magnetic domain wall moving layer;
a second electrode connected to the magnetic domain wall moving layer at a position different from the first electrode; and
a third electrode connected to the reference layer,
wherein the magnetic domain wall moving layer includes
a first area in which an orientation direction of magnetization is fixed,
a second area in which the orientation direction of magnetization is fixed in a direction different from that of the first area, and
a third area sandwiched between the first area and the second area and in which the orientation direction of magnetization is changeable,
the first electrode is connected to the first area,
the second electrode is connected to the second area, the magnetic domain wall moving layer has a length in a first direction longer than a length in a second direction orthogonal to the first direction when viewed in a lamination direction, a read current flows between the second electrode and the third electrode, and in the first direction, a center of the third area in the first direction is between a center of a first connection surface of the third electrode and the reference layer in the first direction and a center of a second connection surface of the second electrode and the magnetic domain wall moving layer in the first direction.

2. The magnetic domain wall moving element according to claim 1,
wherein a first end of the first connection surface closest to the second electrode in the first direction is located farther from the second electrode than a center of the third area in the first direction.

3. The magnetic domain wall moving element according to claim 1,
wherein a center of the first connection surface in the first direction overlaps the first area when viewed in the lamination direction.

4. The magnetic domain wall moving element according to claim 1,
wherein a first end of the first connection surface closest to the second electrode overlaps the first area when viewed in the lamination direction.

5. The magnetic domain wall moving element according to claim 1,
wherein a second end of the first connection surface farthest from the second electrode does not overlap the third area when viewed in the lamination direction.

6. The magnetic domain wall moving element according to claim 1,
wherein a first end of the first connection surface closest to the second electrode does not overlap the third area when viewed in the lamination direction.

7. The magnetic domain wall moving element according to claim 1,
wherein each of the reference layer and the non-magnetic layer is longer than the third area in the first direction.

8. The magnetic domain wall moving element according to claim 1,
wherein the reference layer is longer than the magnetic domain wall moving layer in the first direction.

9. The magnetic domain wall moving element according to claim 1,
wherein the third electrode is shorter than the reference layer in the first direction.

10. The magnetic domain wall moving element according to claim 1,
wherein the reference layer is closer to a substrate than the magnetic domain wall moving layer.

11. The magnetic domain wall moving element according to claim 1,
wherein the first electrode has a first magnetization fixed layer that fixes magnetization of the first area,
the second electrode has a second magnetization fixed layer that fixes magnetization of the second area, and
a film thickness of the second magnetization fixed layer is thicker than a film thickness of the first magnetization fixed layer.

12. The magnetic domain wall moving element according to claim 1,
wherein each of the first electrode, the second electrode, and the third electrode includes a via wiring extending in the lamination direction.

13. A magnetic array comprising:
a plurality of magnetic domain wall moving elements,
wherein at least one of the plurality of magnetic domain wall moving elements is the magnetic domain wall moving element according to claim 1.

14. A neuromorphic device comprising:
the magnetic array according to claim 13.

* * * * *